United States Patent Office 3,414,201
Patented Dec. 3, 1968

3,414,201
TALC BENEFICIATION METHOD
Peter H. Bixby, Madison, N.J., assignor to Resource Processors, Inc., Hoboken, N.J., a corporation of Georgia
Continuation-in-part of application Ser. No. 401,395, Oct. 5, 1964. This application Nov. 2, 1967, Ser. No. 685,227
13 Claims. (Cl. 241—4)

ABSTRACT OF THE DISCLOSURE

A method for separating talc ores into platy and non-platy particles for removing non-talc particles from talc ore is disclosed. The method contemplates crushing the ore and separating it into size groupings and heating the groupings and passing the groupings through a fluid separator to separate the particles in each of the groupings into platy and non-platy talc particles. Some of the particles are then passed through an electrostatic separator for further separation. The use of the fluid separator can be dispensed with under certain circumstances.

---

This application is a continuation-in-part of my copending application Ser. No. 401,395 filed Oct. 5, 1964 for Talc Beneficiation Method, now abandoned.

This invention relates to a method for separating talc from non-talc particles and for separating platy talc from non-platy talc particles.

It is well known to those skilled in the preparation of talcum powders for cosmetic purposes, that a talc of essentially all platy, or laminated particle shape will produce a cosmetic powder of the finest feel or slip. However, there are only a limited number of deposits of natural talc which are of a purity and platy talc content satisfactory to produce a high grade talcum powder. It is also well known that most industrial applications of talc require an ore enhanced by careful control of the analysis or purity of the raw talc. Most natural talc deposits occur with greater or lesser percentages of particles of talc and other minerals which do not have the platy or laminar shape. Hence most talc deposits require treatment or beneficiation of the ore to produce high grade talcum powder.

Present commercial wet processes for the beneficiation of talc have numerous disadvantages, foremost among which is the deleterious effect on the talc ore by the water slurry employed in the process, which tends to reduce the attractive appearance of the talc. In addition, the wet processes are costly in terms of initial plant cost, equipment installation, operation, and maintenance because of the large volumes of solutions and slurries which must be handled in these processes. The dewatering and drying of the final product also makes these processes costly. Furthermore, when the wet processing of talc involves froth flotation procedures, it is required in almost all instances that chemical reagents be added to the slurry, the chemical additivies adding further to the operating cost.

It is therefore the primary object of the present invention to provide a process for beneficiating talc which circumvents all of the disadvantages involved in using wet processes.

It is another object of this invention to provide a process for the dry beneficiation of talc which produces a talc of high platy content and high purity which is particularly suitable for use in talcum powders.

It is another object of this invention to provide a dry process for separating talc ore into platy and non-platy particles.

It is another object of this invention to provide a dry process of beneficiating natural talc ores to produce a talc product of controlled analysis or specification from an ore or ores of varying characteristics or containing non-talc minerals in percentage exceeding permissible limits for the end use of the talc.

It is a further object of this invention to provide a process for the preparation of a high grade talc using the physical characteristics of talc as a basis for the separation of the talc into platy and non-platy particles.

Figure 1:
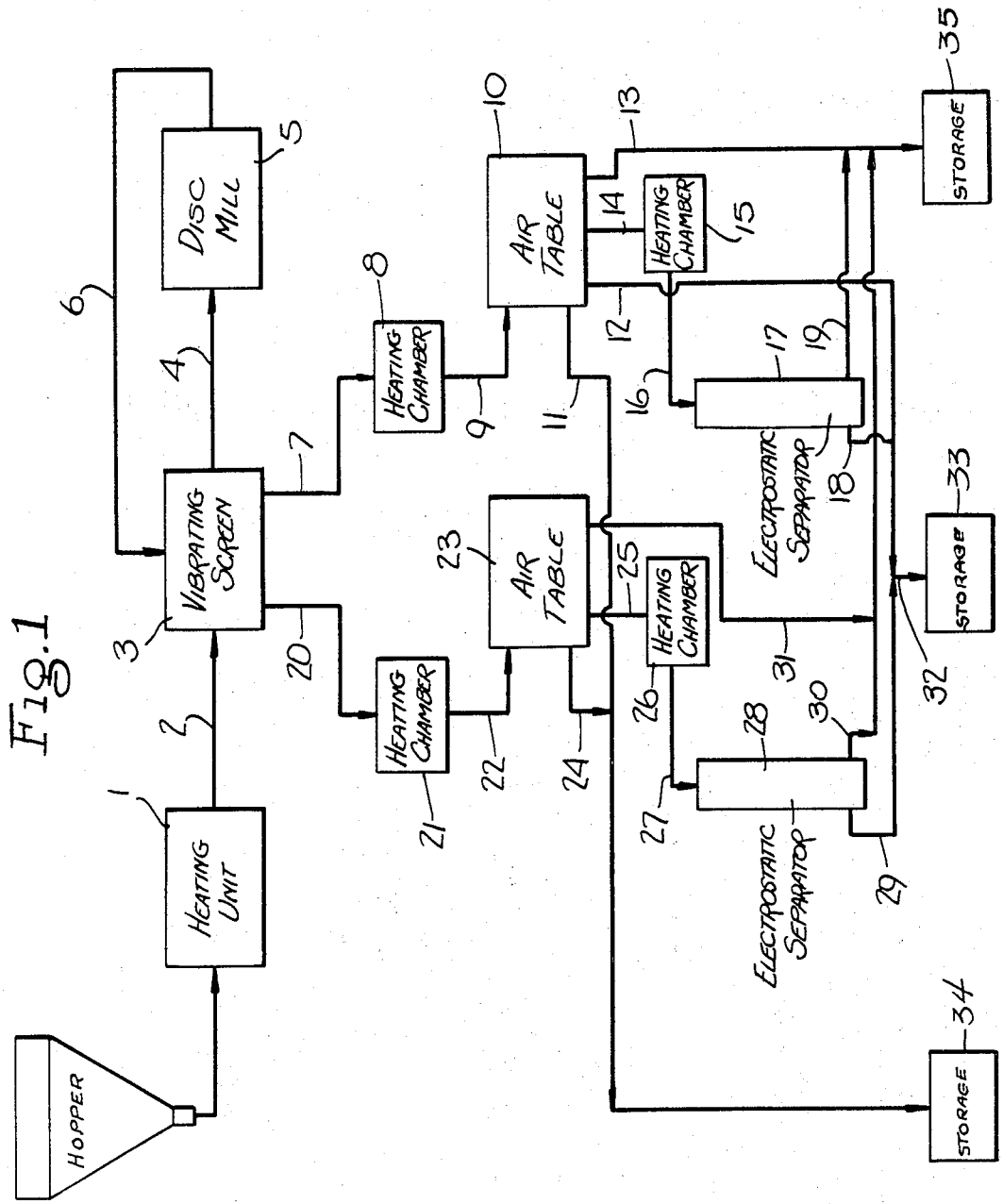
FIG. 1 is a block diagram of a method in accordance with the present invention.

According to this invention, there is provided a process for the beneficiation of talc which involves the separation of talc ores into platy and non-platy particles or the removing of non-talc particles from the talc ore which comprises heating and drying talc ores at elevated temperatures to substantially remove all moisture from said ores, subjecting said heated ores to a crushing step whereby substantially all of said ores are reduced to a predetermined particle range size, separating said crushed ore particles into groupings according to predetermined mesh sizes, passing each of said separated talc groupings to a fluid medium separator and passing a controlled flow of gas through each of said talc groupings such that the platy talc particles in each of said groupings are fluidized thereby separating said platy particles from the non-platy particles in each of said groupings. Also according to present invention a method is disclosed which dispenses with the fluid separation.

While I will disclose in the specification examples of separating talc particles from non-platy talc particles, it is obvious that the invention can be used to separate non-talc particles from talc particles.

In carrying out the process of this invention, the talc ore is usually crushed in a primary crushing operation which reduces the ore to relatively uniform particles of a mesh size in the range of about ⅜ inch to ½ inch. I have found it particularly desirable to heat the crushed particles to a temperature in the range of about 210° to about 250° F. at the same time or immediately after the primary crushing operation. Preferably, I crush the ore first and then heat the crushed particles before subjecting the crushed ore to subsequent processing steps. I have found that while separation of platy from non-platy particles can be obtained from an ore which has not been heated and dried, both the recovery and purity of the recovered material are significantly improved when the ore is treated at elevated temperatures within the range mentioned above. This heating step has the advantage of removing moisture from the ore and thus helps prevent the platy talc particles from becoming stuck or agglomerated to non-platy particles. The elimination of moisture also helps to maintain the crushed talc particles in a free flowing condition such that the particles are readily separated one from another and in this way uniform flow rates can be maintained.

Subsequent to the heating and drying step, the ore lumps may be passed to a secondary crusher for further size reduction if desired. This crusher may be a stand-and roll crusher which has the advantage of being a positive crusher and which can be adjusted to crush the particles to predetermined sizes.

The ore is then ready for the final grinding operation where it is reduced to a size such that almost all of its will pass through a screen of predetermined mesh size such as 20 mesh. This grinding or crushing operation may be carried out in a hammer mill, a pebble mill or an impact mill. However, it has been found that a disc type attrition mill such as that manufactured by the Sprout-Waldron Manufacturing Co., is particularly suitable for this final grinding. A disc mill consists of two discs which are mounted face to face, in which at least one, and sometimes both discs may be rotating. Both discs are usually slightly concave so that a space exists at the center of the discs between the discs. The material to be ground by the mill is generally fed by a gravity chute or other type of conveyor to the center area of the disc. The clearance between the disc is reduced radially outward from the center. Therefore, the material to be ground is subjected to an irresistible shearing force as the particles pass downward and outward from between the control rotating disc. The grind or degree of fineness of a product treated in such a manner can be adjusted by adjusting the clearance between the discs. I have found this particular type of crushing operation to be eminently suitable for use in the present invention because the shearing action delaminates the laminar talc particles with minimum unnecessary fracturing of the individual platelets of the talc. This of course permits a high recovery of platy talc particles because as a general rule working with the largest possible size of particles which can be satisfactorily separated will hold to a minimum the production of extremely fine particles which cause interference in almost all processes of benefication.

Following the final grinding stage, the talc ore is passed to a separator, e.g., a vibrating screen such as that manufactured by the Orville Simpson Co. where it is divided into portions depending upon predetermined mesh sizes. The particles are grouped according to size in as many groupings as is feasible because the closer the size of the particles in any one grouping, the greater the efficiency of the separation and the purity of the product produced. For example, the talc might be divided into four portions, one containing all talc particles of +20 mesh size or larger, the second containing those in the range of —20+40 mesh, the third containing those in the range of —40+80 mesh and the fourth containing all particles smaller than —80 mesh.

It has been found however that a good separation can be made on some ores without first dividing into 2 or more portions, however, this "sizing" step will usually make the commercial application of the methods more efficient and can permit closer control of processing rates and the end products.

Upon compartmentization, the talc is in condition for separation into platy and non-platy particles. I have found it particularly desirable to heat each portion of the talc particles to a temperature in the range of about 212° F. to 235° F., preferably about 220° F. before actually attempting to separate the particles into platy and non-platy particles. I have found that this heating step improves the separation considerably although the step may be omitted if desired. The first stage of the separation is carried out on an air float table such as that manufactured by Sutton Steele & Steele Company. This table is designed to separate two materials of different specific gravities. However, although platy and non-platy talc particles have the same specific gravity, it has been found that the physical structure of the platy talc particles provides a means of separating these particles from the non-platy particles which are dissimilarly shaped particles. The air float table is a fluid medium separator and in the operation of this device, air is the preferred fluid medium, although any other gas could be used with special hood equipment to contain the gas. The air table consists of a vibrating or oscillating deck which acts as a vibrating conveyor of material placed upon the deck. The deck is perforated and permits the flow of air to be passed upwardly through the deck and partially suspend the particles of the material in the air stream. The characteristics of the talc permits the separation to take place on the table deck. The platy talc particles present a broad surface area to the air flow and are buoyed up by the air to a greater degree than are the non-platy particles. Thus the platy particles take on the characteristics of a mineral of low specific gravity and the non-platy particles take on the characteristics of a heavier mineral constituent.

Proper adjustment of the table permits the deck to be inclined such that vibratory action of the table conveys the material upwardly along the deck. I have found that good results are obtained when the table has a 5° end slope and a 2° side slope. It should be understood however that the actual degree of slope will depend upon the characteristics of the particular talc being processed such as size of the talc particles. The air flow through the deck is adjusted to maintain its fluidized action on the material during the conveyance of the material along the deck. Further increase in air flow accentuates the separating action of the device. The platy talc particles are buoyed up and are released from the conveying action of the oscillating table deck. The air flow is maintained such that it is not sufficient to lift the non-platy particles from the conveying surface so that the platy particles flow over the lower edge of the table deck and the non-platy particles off the upper edge.

In carrying out the process, an air table is provided for each talc particle size grouping which had been previously made according to predetermined mesh size ranges. Hence the air tables may all be run simultaneously with the air flow in each table adjusted to the proper degree depending upon the mesh size of the particles being fed to the table; the larger mesh size particles requiring a larger air flow than the smaller mesh size particles.

When the talc ore is about 50% platy talc content, then separation of the ore into two groups such as mentioned above is satisfactory for obtaining good yield and purity of the final product. The number of groupings will be increased or decreased depending upon the platy talc content of the ore itself, the ore of higher platy talc content needing fewer groupings, whereas ore of lower platy talc content needs more groupings.

In carrying out the separation, it is particularly important that the temperature of the materials being separated on the air float be maintained at elevated temperatures and this may be accomplished by introducing heated air into the air table rather than air at room temperature which would tend to cool the talc particles and introduce moisture into the particles.

The products recovered from each air table generally consists of four types, platy talc of predetermined mesh size range, granular talc of predetermined mesh size range, a middling fraction consisting of a mixture of platy and non-platy talc and fines or dusts. Each of these types of products may then be combined or admixed with each other in any desired ratio. The platy talc fractions from each air table may be combined as may be the dust and granular talc fractions.

I have found that talc particles in the range of about —80 to +400 mesh may not be effectively separated by means of an air table. I have discovered that particles of this size may be separated by means of an electrostatic separation method. This method has also been found to be very effective in separating the so-called middling fraction in platy and non-platy talc. It has been observed that platy talc particles exhibit a strong repulsion to a negatively charged electrode (or an attraction to a positively charged electrode), and hence this property affords a method whereby the +60 mesh platy talc material can be separated from non-platy talc and non-platy gangue materials. The electrostatic separator is preferably of the type shown in Bullock U.S. Patent No. 2,225,096 issued Dec. 17, 1940.

Prior to passing the talc fractions to the electrostatic separator, I have found it desirable to heat the particles to a tempertaure in the range of 212° F. to 235° F., preferably about 220° F., since I have found that this step aids the separation of the particles into platy and non-platy fractions.

Upon separation of the platy talc from the non-platy talc or the talc from the non-talc fractions, all of the portions of the non-platy talc may be passed to a grinder where further grinding releases entrained talc or platy particles which may occur as inclusions in non-platy talc or non-platy gangue minerals. Such further grindings may take place in a hammer mill, or other suitable grinder, and further recovery of the platy material may be accomplished by again passing this material to the air float tables or to electrostatic separators. However, it has been found desirable to pass this material to a disc type attrition mill where its characteristics will be improved in such a way as to be advantageous to the further separation or platy materials included in the non-platy materials. This material may then be passed to the air float tables or electrostatic separators.

I have found that it is possible to make a separation of talc particles from non-talc particles on the electrostatic separator at sizes coarser than 80 mesh. This makes it possible to eliminate the step of passing the ore over the air float table. By-passing this step is particularly indicated if the talc particles are of a nature that they will not readily delaminate or if by nature they are similar in shape to the non-talc particles present in the ore.

For a more detailed description of the invention, reference should now be had to FIG. 1 of the accompanying drawing which is a schematic diagram of the process of this invention and to the following illustration of the process.

369 lbs. of crude crushed talc ore was passed from a hopper to heating unit 1 where it was heated to 250° F. and passed through chute 2 to vibrating screen 3 where the ore was divided into three groupings; +20 mesh material, −20+60 mesh material and −60 mesh material. The +20 mesh material was passed through chute 4 to disc mill 5 where it was ground to a particle size of −20 mesh and returned to screen 3 through chute 6. The −20+60 mesh material was discharged through chute 7 while the −60 mesh material was discharged through chute 20. At this point in the process the 369 lbs. of ore was divided into 39 lbs. of +20 mesh materials, 180 lbs. −20+60 mesh material and 150 lbs. of −60 mesh material.

The −20+60 mesh particles were conveyed through chute 7 to heating chamber 8 where the particles were heated to about 220° F. and then conveyed to air table 10 through chute 9 where they were separated into a platy talc product which was discharged through chute 12, dust which was removed through chute 11, non-platy granular material which was removed through chute 13 and a middling fraction consisting of granular non-platy material which was discharged through chute 14.

At this point in the process 31 lbs. of platy talc material (17.2% of the −20+60 mesh fraction) having acid solubles content of 1.3–1.7% was obtained from chute 12. A middling fraction of 96 lbs. (53.4% of the −20+60 mesh fraction) having an acid solubles content of 9.5–13.7% was obtained through chute 14. 49 lbs. of granular non-platy talc material (27.2% of the −20+60 mesh fraction) having an acid solubles content of 39.5–58.0% was obtained through chute 13 and 4 lbs. of dust (2.2% of the −20+60 mesh fraction) having an acid solubles content of 7.8% was removed through chute 11.

The 96 lbs. of middling fraction was heated to about 220° F. in chamber 15 and then passed to electrostatic separator 17 through chute 16 where it was separated into 59 lbs. of platy material (61.5% of the middling fraction) having an acid solubles content of 2.6–2.8% which was discharged through chute 18 and 37 lbs. of non-platy material (38.5% of the middling fraction) having an acid solubles content of 35.5% which was discharged through chute 19.

The −60 mesh material from chute 20 was passed to heating unit 21 where it was heated to a temperature of about 220° F. and then passed to air table 23 through chute 22. No platy talc fraction was removed as such from the air table. 107.5 lbs. of a middling fraction (7.3% of the −60 mesh fraction) having an acid solubles content of 14.8% was discharged from the air table through chute 25. 18.0 lbs. of non-platy talc material (12% of the −60 mesh fraction) having an acid solubles content of 57.8% was discharged through chute 31. 22 lbs. of the dust (14.7% of the −60 mesh fraction) having an acid solubles content of 9.5% was discharged through chute 24.

The 107.5 lbs. of middling fraction was heated to about 220° F. in chamber 26 and passed through chute 25 into electrostatic separator 28 through chute 27 where it was separated into platy and non-platy material. 45.5 lbs. of non-platy talc material (42.8% of the middling fraction) was obtained. This material had an acid solubles content of 49.2% and was discharged through chute 30. 62 lbs. of platy talc material (57.2% of the middling fraction) was removed from the separator through chute 29. This material had an acid solubles content of 4.0.

The platy material obtained through chutes 12, 18 and 29 was combined and passed through chute 32 to storage unit 33. The dust material obtained through chutes 11 and 24 were combined and passed to storage unit 34. The granular non-platy talc material obtained through chutes 13, 30 and 31 were combined and passed to storage unit 35.

It is apparent that the stored fractions may be combined with each other in any desired ratio. It is likewise apparent that he material fed to screen 3 from chute 2 may be passed first to disc mill 5 before being passed to screen 3. Many other modifications of this process will be apparent to those skilled in the art.

A summary of the material processed in the above example is set forth below:

Feed: 369 lbs. talc ore

|  | Pounds | Acid Solubles, percent |
|---|---|---|
| Platy talc fractions: |  |  |
| −20+60 mesh air table product | 31 | 1.3–1.7 |
| −20+60 mesh electrostatic product | 59 | 2.6–2.8 |
| −60 mesh electrostatic product | 62 | 4.0 |
|  | 152 (41%) |  |
| Non platy talc product: |  |  |
| +20 mesh | 39 | 18–22 |
| −20+60 mesh electrostatic product | 49 | 39 |
| −20+60 mesh electrostatic product | 37 | 35.5 |
| −60 mesh air table product | 18 | 37.8 |
| −60 mesh electrostatic product | 45.5 | 49.2 |
|  | 188.5 (51%) |  |
| Meddling product (dust collector): |  |  |
| −20+60 mesh | 4 | 7.8 |
| −60 mesh | 22 | 9.5 |
|  | 26 (7%) |  |
| Loss | 2.5 (1%) |  |

The following example illustrates the effectiveness of the heating step.

The −20+60 mesh material was tabled as in the above example and the middling fraction was then run through the electrostatic separator at 12,500 volts. A platy talc fraction having 14% acid solubles was obtained and a non-platy talc fraction having 29% solubles was obtained.

This same material was then heated to about 220° F. and run through the electrostatic separator at 12,500 volts. A platy talc fraction having an acid solubles content of 5.2% was obtained while the non-platy talc fraction had an acids soluble content of 35.0%.

As previously described, the present invention also contemplates separating a talc ore into talc and non-talc fractions without first using the airfloat table. The elimination of the air float table is possible when the talc is substantially of the non-platy type and when it is desired to separate talc particles from non-talc particles at sizes coarser than 80 mesh.

Figure 2:
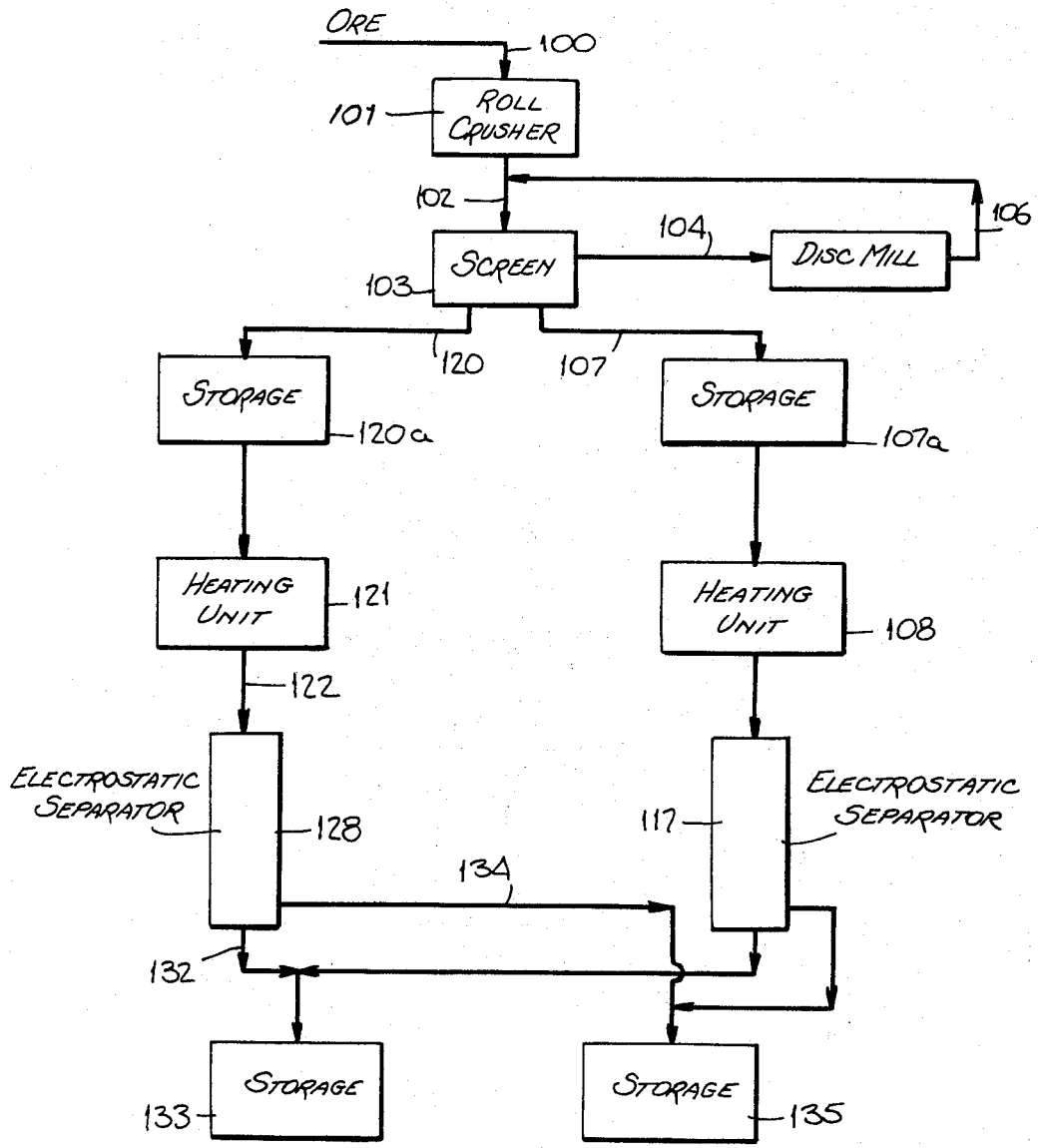
FIG. 2 is a block diagram of a modified form of the method of FIG. 1.

In FIG. 2 the method of processing talc without use of an airfloat table is disclosed. A natural talc ore of varying analysis, such as one having an acid soluble content which varies from 8% to 14%, can be used. The ore is delivered by a chute 100 to a crusher 101, preferably a roll crusher, so as to be crushed to fine particles, preferably finer than ¼ inch in size. The ore may be dried first, but this can be eliminated for a naturally dry ore. The crushed ore is delivered by a chute 102 to a vibrator screen 103, similar to the screen disclosed in connection with FIG. 1. Screen 103 divides the particles into the desired size, fractions, preferably those coarser than 20 mesh material, next those of −20+60 mesh material and finally those finer than 60 mesh material. The larger mesh material (oversize) is passed to a disc mill 105 by a chute 104 for further size reduction and is returned to screen 103 by chute 106. In this manner the entire sample can be reduced in size.

One size fraction, such as the preferable size fraction −20+60 mesh material, is passed to heating unit 121 by a chute 120. Storage means 120a can be used as needed in transferring material to heating unit 121. Heating unit 121 heats the material to a temperature of preferably 230° F. From this step the heated material is transferred by chute 122 to electrostatic separator 128 which separates the ore into talc and non-talc factions. The talc faction is passed to storage means 122 by chute 122 while the non-talc residue is transferred to storage means 135 by chute 134. The other size crushed ore which may preferably be about minus 60 mesh, follows a parallel course as it is heated by heating unit 108 and separated into talc and non-talc particles by electrostatic separator 117 with storage means 107a used as needed. The talc fraction combines with the talc fraction from electrostatic separator 128 in storage means 133 while the non-talc fraction combines with the non-talc fraction from electrostatic separator 128 in storage means 135. Storage means 133 and 135 are preferably fibre drums. It is to be understood that he parameters used in the preceding discussion are for purposes of illustration only and are not intended to be the only ones possible in using the present invention.

A production run in accordance with the principles of the second embodiment of the present invention could handle from 4600 parts/hr. to 5000 parts/hr. of platy talc ore.

The ore was divided into two portions, −20+60 mesh and all minus 60 mesh. The −20 mesh amounted to approximately 2400 parts/hr. and the −60 mesh amounted to approximately 2280 parts/hr. (The difference due in part to loss of moisture from the crude ore.) The portions were passed individually to the electrostatic separators and separated into talc and non-talc products.

The talc products were combined from both portions and produced at a rate of aproximately 2200 parts/hr. The non-talc products of both portions were produced at a rate of approximately 2400 to 2600 parts/hr. The talc portion was maintained at an acid soluble level of approximately 4.5% while the non-talc portion varied from 35 to 42% acid soluble.

Having thus provided a written description of the present invention and provided specific examples thereof, it should be understood that no undue restriction or limitations are to be imposed by reason thereof but that the present invention is defined by the appended claims.

What is claimed is:

1. A process for the beneficiation of talc by the separation of talc particles into platy and non-platy particles which comprises the steps of crushing talc ore to a predetermined particle size, heating and drying said talc ore, separating said crushed talc particles into groups according to mesh size ranges, passing each of said groups to a fluid separating system wherein a controlled flow of gas is passed through said groups such that the platy talc particles in said groups are fluidized thereby separating said platy particles from the non-platy particles in said groups.

2. A process according to claim 1, wherein the step of heating and drying said talc ore is done at elevated temperatures to remove moisture from the particles, and the process includes the step of collecting the separated platy particles from the non-platy particles after passing the controlled flow of gas through them.

3. A process according to claim 2 including the step of subjecting said heated crushed ore to another crushing step wherein substantially all of the crushed particles are reduced to a predetermined particle size.

4. A process according to claim 3 wherein said crushing is accomplished by subjecting said ore to a shearing force such that said ore is reduced to particles having a predetermined mesh size range.

5. A process according to claim 4, wherein said shearing force is obtained from a disc mill and said fluid separator includes air float tables having inclined decks through which controlled flows of air are passed so as to entrain the platy particles thereby separating the platy particles from the non-platy particles.

6. A process according to claim 3, wherein said crushing is accomplished by subjecting said particles to a shearing force which delaminates the laminar talc particles with minimum fracturing of the individual platelets of talc and at the same time reduces said talc particles to a predetermined size.

7. A process according to claim 6 including the step of subjecting said crushed particles to a vibratory action thereby separating said crushed particles into groups according to size and the controlled flow of gas is air which passes through an inclined oscillating air float table to fluidize the platy talc particles thereby separating the platy particles from the non-platy particles.

8. A process for the beneficiation of talc by the separation of talc particles into platy and non-platy particles which comprises heating and drying said particles at elevated temperatures to remove substantially all moisture from said particles, passing talc particles to a crushing operation wherein said particles are subjected to an irresistible shearing force so as to delaminate the laminar talc particles with minimum fracturing of the individual platelets of talc while at the same time reducing said talc to a predetermined mesh size range, subjecting said crushed particles to a vibrating action wherein said particles are separated into mesh size groups of +20 mesh and larger, −20+60 mesh and −60 mesh, heating the latter two of said talc groups at elevated temperatures and passing said two talc groups to a fluid separation system comprising inclined oscillating air float tables through which a controlled flow of air is passed such that the talc particles in each of said groups are fluidized thereby separating the talc particles into a platy fraction, a middling fraction and a non-platy fraction, passing said middling fraction to an electrostatic separation system wherein the platy particles are separated from non-platy particles and recovering the platy particles separated in each of the separations.

9. A process for the beneficiation of talc by the separation of talc particles into platy and non-platy particles which comprises heating and drying talc particles at elevated temperatures to remove moisture from said particles, subjecting said particles to an irresistible shearing force such that the particles are delaminated with a minimum of fracturing while at the same time reducing said particles to a predetermined mesh size range, subjecting said crushed particles to a vibratory action whereby said particles are separated into groups according to predetermined mesh size ranges, heating each of said groups at elevated temperatures to remove moisture from said particles, passing each of said groups to a fluid separation system comprising an inclined oscillating air float table through which a controlled flow of air is passed such that the talc particles in each of said groups are fluidized thereby separating the talc particles into a platy fraction, a middling fraction and a non-platy fraction, passing at least one of said middling fraction to an electrostatic separation system wherein the platy particles are separated from the non-platy particles and recovering the platy particles separated in each of the separations.

10. A process according to claim 9, wherein at least one of said middling fractions is heated before being passed to the electrostatic separator.

11. A process for the beneficiation of talc ore which comprises the steps of heating the ore, crushing the ore to a predetermined particle size, separating the crushed ore as to distinct size groupings, heating each of said groupings and passing each of said groupings through an electrostatic separator so that the particles are separated into different fractions and recovering the different fractions.

12. A process according to claim 11 wherein the electrostatic separator separates the ore into talc and non-talc fractions.

13. A process for the beneficiation of talc by the separation of talc particles into platy and non-platy particles which comprises heating and drying talc particles at elevated temperatures to remove moisture from the particles, subjecting said particles to a crushing force to reduce the particles to a size of at least coarser than 80 mesh, subjecting the particles to a vibratory action whereby said particles are separated into groupings according to size, heating each of said groups to remove moisture from the particles, passing each of the groups through an electrostatic separator to separate the particles into platy and non-platy particles and separating said platy particles from said non-platy particles.

References Cited

UNITED STATES PATENTS

| | | | |
|---|---|---|---|
| 1,310,939 | 7/1919 | Bancroft | 241—4 |
| 2,765,074 | 10/1956 | Diamond | 241—4 X |
| 2,813,626 | 11/1957 | Johnson et al. | 241—4 X |
| 2,844,486 | 7/1958 | Lamar | 241—16 X |

ANDREW R. JUHASZ, *Primary Examiner.*

FRANK T. YOST, *Assistant Examiner.*